May 12, 1942.  W. S. GINNEL  2,282,400
COOKING UTENSIL
Filed Oct. 2, 1940
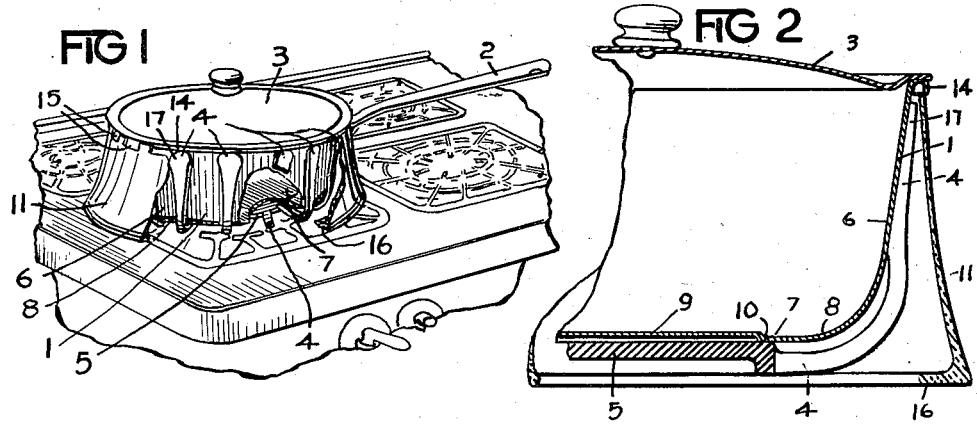
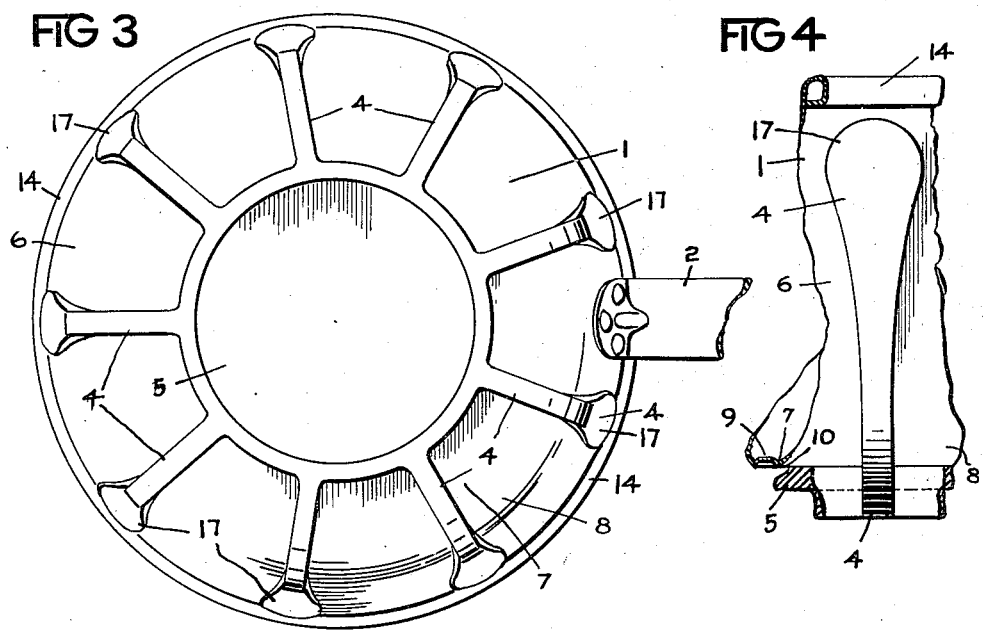
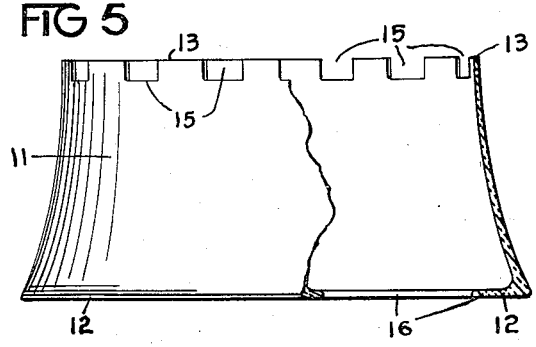
INVENTOR.
WILLIAM S. GINNEL.
BY
Paul A. Talbot.
ATTORNEY.

Patented May 12, 1942

2,282,400

UNITED STATES PATENT OFFICE 2,282,400

COOKING UTENSIL

William S. Ginnel, New York, N. Y.

Application October 2, 1940, Serial No. 359,379

9 Claims. (Cl. 53—8)

My invention relates to a cooking utensil in which the heat of combustion is evenly applied to the utensil up its side walls as well as on the bottom and among its purposes and objects are to provide:

A cooking utensil having even and uniform heat distribution from the fire below.

A cooking utensil which will not cook food faster at the bottom than at the top.

A cooking utensil which will not burn or overheat food on its bottom interior surface.

A cooking utensil having heat applying and heat radiant insulation.

A cooking utensil which distributes heat uniformly to food being cooked and a surrounding insulating heat insulating shield which conserves heat and applies substantially all of the heat to the food being cooked or heated in the utensil.

I accomplish these and other objects by the construction herein described and shown in the accompanying drawing forming a part hereof in which:

Fig. 1 is a perspective view showing the application of my device.

Fig. 2 is a part sectional elevation of my device.

Fig. 3 is a bottom view with the insulation shield removed.

Fig. 4 is a fragmentary detail of one of the heat conductors.

Fig. 5 is an elevation and partial section of the insulating shield.

Similar reference characters refer to similar parts throughout the several views of the drawing and in the specifications to follow.

I am aware that numerous attempts have been made to better distribute the heat to the food being cooked in cooking utensils, among them being double boilers, steam cookers, insulated or self cookers, and devices with double bottoms and insulated bottoms.

Devices having double walls with steam or boiling water surrounding the food container have the disadvantage of being limited to the boiling temperature of water and also are slow in heating the food being cooked and the water which heats the food. The devices having insulated bottoms to better distribute the heat of the fire, when tested for heat distribution only partially accomplish the result desired because the heat is not distributed up the walls of the vessel containing the food, with the result that the food, while not burning or sticking to the center of the bottom, is overheated or burned and sticks around the periphery of the bottom.

By the use of my invention, tests made by competent engineers and with delicate instruments show that the top of the vessel is heated to the same temperature as the bottom and if desired, the top may, by modifying the heat conductors, be heated to a greater temperature than the bottom in a given period of time, and also that this characteristic progresses as the heat is applied to the bottom in the usual manner throughout a wide range of periods of heating and the consequent temperature changes which increase as the period of heating is increased.

In the drawing, I have illustrated one of the constructions embodying the underlying principles of my invention. This disclosure is made in detail so that my invention may be better understood and I do not wish to be limited to these details as to those skilled in the art to which my invention pertains, it will be obvious that the construction may be modified without departing from the underlying principles of my invention which I seek to protect by patent, the elements of which are set forth in the appended claims.

My cooking utensil may be a sauce pan 1, of the usual shape, having a handle 2 and cover 3, or any similar vessel. I have secured conductors 4 which preferably radiate from the heating plate 5 to the vessel near the top of its side walls 6. The conductors carry heat from the heating plate away from the bottom 7 of the vessel and are so spaced and so shaped as to contact the side wall to the required degree and distance from said heating plate as to apply by contact the desired heat throughout the entire height of the side walls where the heat is least from the products of combustion. The conductors are spaced away from the utensil at and near the marginal edges 8 of the bottom where the temperature of the gasses of combustion is high.

The heating plate is held away from the center 9 of the bottom of the vessel by the relatively narrow contact ring 10. The area of contact, the distance from the zone of greatest heat and the flow of the gases of combustion are the important factors for determining the shape, size and position of the various parts of the conductors and the heating plate.

The flow of the gases of combustion and the insulation of my device to minimize the radiation of heat is accomplished by the shield 11 preferably of nonconducting and heat resisting material of cylindrical form or somewhat bell shaped at the bottom 12 and which surrounds the vessel and the conductors and is of a size or diameter at its open top end edge 13 to receive the vessel and conductors and to permit the outwardly flanged top periphery 14 of the vessel to rest on the edge 13. The edge 13 may be serrated or provided with the gas outlets 15, one of which may serve to receive the handle 2 of the vessel. The number of the outlets may correspond with the number of conductors and these outlets may be spaced to provide the maximum flow of hot gases near the center between the conductors. The handle of the vessel in such case serves to accurately position the outlets between the conductors.

The bottom 12 of the shield may be provided with an inwardly projecting flange 16 to prevent the inflow of cold air from being induced by the upward flow of hot gas from entering the space between the shield and the vessel.

My device may be used with or without the shield and may be proportioned so that the conductors provide the necessary heat to raise the temperature of the top of the vessel to equal the temperature of the bottom without the shield and to a higher temperature with the shield, or I may provide a shield with no outlets at the top to prevent the flow of hot gases up the sides of the vessel, thereby reducing the temperature at the top of the vessel as well as around its side walls.

The conductors are preferably increased in width of contact with the vessel near each of their ends 17. The width and area as well as the position of the ends of the conductors in contact with the vessel govern the temperature in and near the zone of contact.

The space between the heating plate may be provided by raising the bottom surface of the vessel or by recessing the upper surface of the heating plate or both. More than one contact ring may be provided to provide the desired heat to the bottom of the vessel.

The size, shape and details of construction may vary to suit the many uses my invention is adapted to and such modifications are intended to come within the scope of the appended claims which set forth my invention.

I claim:

1. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof.

2. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof, said heating plate having a contact ring contacting the bottom of said vessel and said heating plate.

3. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof, an outwardly extending flange at the top of said vessel and a shield surrounding said conductors and said vessel engaging said flange and supporting said vessel.

4. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof, an outwardly extending flange at the top of said vessel and a shield surrounding said conductors and said vessel engaging said flange and supporting said vessel and outlets around the top of said shield to permit the flow of the gases of combustion between said vessel, said conductors and said shield.

5. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof, said conductors having a greater width or contact area with said vessel near their upturned ends in relation to their contact width therebelow.

6. In a cooking utensil, a vessel, a heating plate spaced away from a substantial area of the bottom of said vessel, conductors extending outwardly beyond said heating plate and spaced away from the bottom of said vessel and at its bottom periphery, said conductors being turned upwardly and secured to said vessel near the top of the sides thereof, an outwardly extending flange at the top of said vessel and a shield surrounding said conductors and said vessel engaging said flange and supporting said vessel and outlets around the top of said shield to permit the flow of the gases of combustion between said vessel, said conductors and said shield and an inturned flange at the bottom edge of said shield preventing the inflow of cold air to the space between the shield and said vessel.

7. In a cooking utensil, a plurality of conductors and a heating plate connected thereto, a vessel secured to said conductors, said conductors projecting outwardly from said heating plate and turned upwardly around said vessel.

8. In a cooking utensil, a plurality of conductors and a heating plate connected thereto, a vessel secured to said conductors, said conductors projecting outwardly from said heating plate and turned upwardly around said vessel, said conductors spaced away from the bottom of said vessel.

9. In a cooking utensil, a plurality of conductors and a heating plate connected thereto, a vessel secured to said conductors, said conductors projecting outwardly from said heating plate and turned upwardly around said vessel, said conductors spaced away from the bottom of said vessel and away from the bottom of the sides of said vessel.

WILLIAM S. GINNEL.